Nov. 18, 1969 G. V. AUCHARD 3,478,831
SELF-PROPELLED WINDROWER
Filed Nov. 22, 1967 5 Sheets-Sheet 2

INVENTOR.
GERALD V. AUCHARD.

Nov. 18, 1969  G. V. AUCHARD  3,478,831
SELF-PROPELLED WINDROWER
Filed Nov. 22, 1967  5 Sheets-Sheet 3

INVENTOR.
GERALD V. AUCHARD.

INVENTOR.
GERALD V. AUCHARD.

Nov. 18, 1969  G. V. AUCHARD  3,478,831
SELF-PROPELLED WINDROWER

Filed Nov. 22, 1967  5 Sheets-Sheet

INVENTOR
GERALD V. AUCHARD.

United States Patent Office 3,478,831
Patented Nov. 18, 1969

3,478,831
SELF-PROPELLED WINDROWER
Gerald V. Auchard, Bettendorf, Iowa, assignor to
J. I. Case Company, Racine, Wis., a corporation
of Wisconsin
Filed Nov. 22, 1967, Ser. No. 685,148
Int. Cl. B62d 11/00; G05g 9/00
U.S. Cl. 180—6.48                             2 Claims

ABSTRACT OF THE DISCLOSURE

A drive and control mechanism for a self-propelled vehicle having a pair of hydraulically actuated variable displacement pumps and a pair of variable displacement hydraulic motors for driving the vehicle. The mechanism includes meshing gears, and chain and sprocket drives connected to the hydraulic pumps and responsive to movement of an operator's handle for varying the output of said pumps. The particular gear and sprocket structure and the adjustable linkage connections to the pumps provide control of two hydraulic systems, working individually or together, with finite and precise control for driving and for steering the vehicle.

BACKGROUND OF THE INVENTION

This invention relates to a drive and control system for a self-propelled agricultural implement wherein the vehicle engine drives hydraulic pumps and the pumps, in turn, drive hydraulic motors connected to the traction wheels. A control mechanism adjacent the operator's station is manually operated and movement of an operator's handle controls the output of the hydraulic pumps.

Hydraulic drive and control systems are being utilized in a wider range in the agricultural and industrial field. The hydraulic systems provide for ease of operation as machines become more complicated and the operator has more devices to supervise during the running of the machine. Prior systems have included fixed displacement pumps and motors, variable displacement pumps and motors, or one variable and one fixed depending upon whether the design was for constant or variable displacement.

The early hydraulic systems have, of course, been complicated, inefficient and costly. The systems have included many valves or servo-devices to control and protect the components and the manufacture of these devices often was also complicated and costly. Those systems have included one or more pumps driving hydraulic motors which, in turn, drive the traction wheels. The controls have included a control handle or lever for each of the drive mechanisms, this being a common method of control for tracked vehicles. Agricultural machines such as combines have been equipped with drive motors adjacent to and connected with the traction wheels and have included steering and braking devices for controlling the speed and direction of travel.

SUMMARY OF THE INVENTION

The present invention is a guidance control system for a self-propelled vehicle wherein a single operating handle is moved by the operator for controlling the speed and direction of the vehicle. The implement with which the control system is used will be shown and described as a self-propelled windrower, although this mechanism could be applied to other vehicles.

The invention is associated with a front and a rear mounted hydraulic pump aligned with and driven by the engine. These pumps are of the variable displacement type so that varying amounts of pressurized fluid are pumped to drive the vehicle. Each traction wheel is driven by a hydraulic motor, the motor being connected to the wheel by chains and sprockets, or other suitable means. Hydraulic fluid lines connect the pump and its motor. These motors are of the variable displacement type and include a high range and a low range for attaining the desired vehicular motion.

The pump control mechanism includes a device called a guidance control box including a support structure carrying two sets of bevel gears on respective shafts, the gears intermeshing and movable in response to operation of the control handle. Sprockets and chains are associated with one set of gears and the chains are connected to the pumps by means of linkage rods. Movement of the control handle changes the position of the gears and the linkage by the same amount because of the fact that back-lash is eliminated from the system. Adjusting buckles and shims are provided for the purpose of eliminating back-lash and for precise and finite control of the pumps.

The advantages of this mechanism are especially important in providing a simple, economical and positive control of the speed and direction of a vehicle.

Other advantages of this control device will become apparent from a reading of the following description taken together with the annexed drawings, in which.

Figure 1:
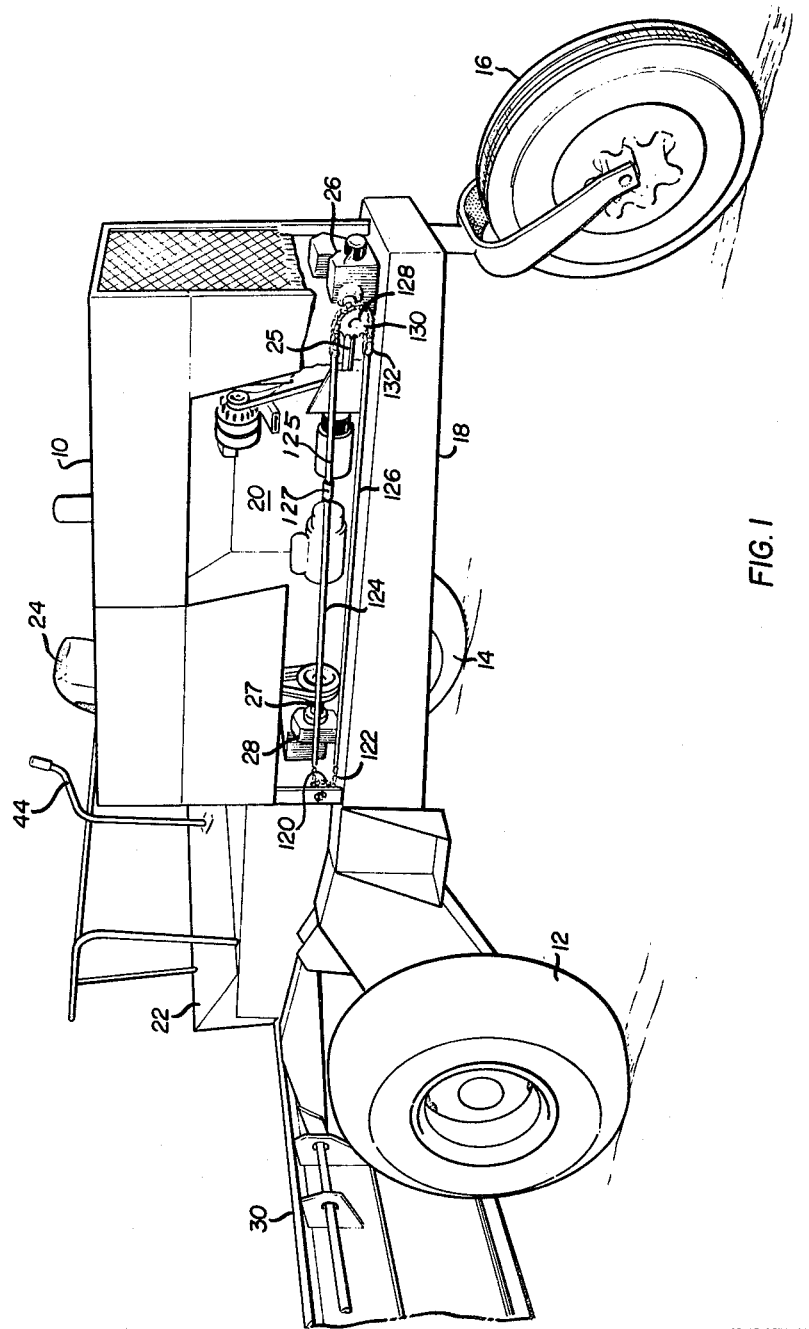
FIGURE 1 is a perspective view of a windrower incorporating the invention.

As seen in FIG. 1, there is shown a self-propelled vehicle 10 having traction wheels 12 and 14 and a ground engaging wheel 16 pivotable on the vehicle. The vehicle, of course, has a frame 18 and an engine 20. An operator's station includes a platform 22, a seat structure 24 on the platform, and control means for driving the vehicle.

The engine has a dual drive in that a drive shaft 25 extends rearwardly and a shaft 27 forwardly of the engine. A pair of variable output hydraulic pumps 26 and 28 are connected to the respective engine drive to be driven thereby, one pump 26 being connected to the rear shaft 25 and the other pump 28 being connected to the front shaft 27. The forward and rearward terms, as used herein, will apply to the direction of travel of the vehicle and since the vehicle will be described as one for propelling a windrower, the direction of travel is normally from right to left in FIG. 1. A part of the windrower 30 is shown attached to the vehicle frame forward of wheels 12 and 14.

Figure 4:
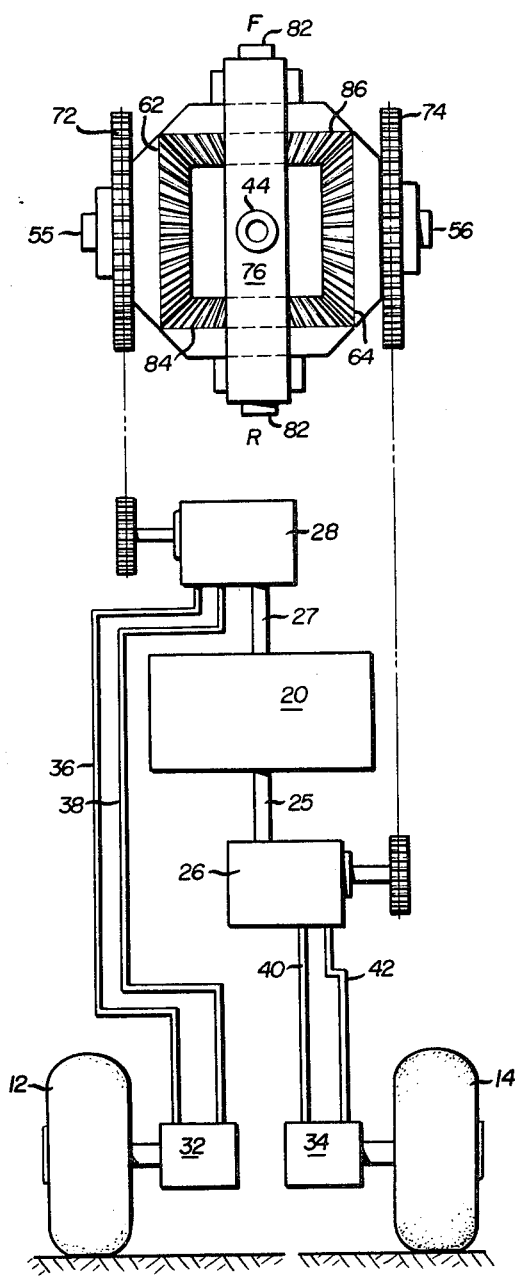
FIG. 4 is a diagrammatic view of the important parts of the control system.

A suitable hydraulic motor of the variable displacement type, fixed in either high range or low range, is drivingly connected to each of traction wheels 12 and 14 as shown diagrammatically in FIG. 4. Motor 32 is connected to the left-hand wheel 12 and motor 34 is connected to the right-hand wheel 14. Hydraulic fluid lines 36 and 38 are connected between pump 28 and motor 32 and lines 40 and 42 are connected to pump 26 and motor 34. Thus the lineup of the driving relationship is that shaft 25 drives rear pump 26 which is connected to motor 34 for driving the right-hand wheel 14, and shaft 27 drives front pump 28 which is connected to motor 32 for driving the left-hand wheel 12.

Figure 6:
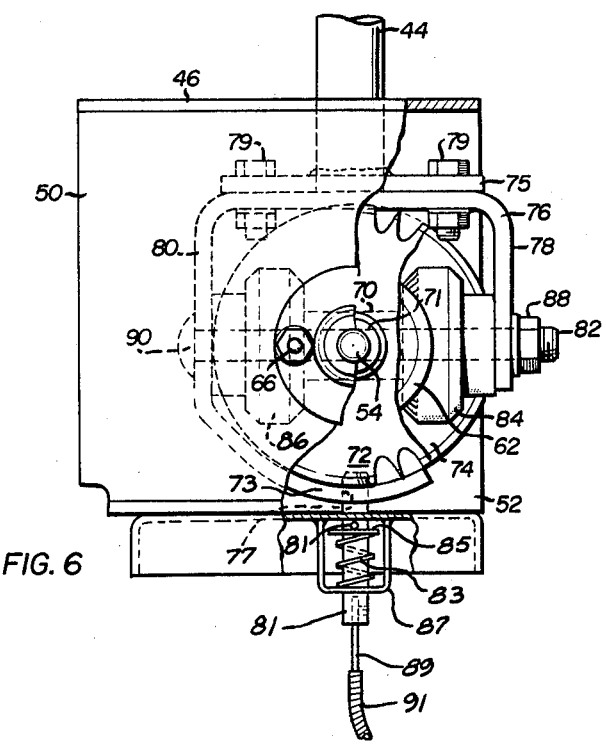
FIG. 6 is a side view of the device.
Figure 5:
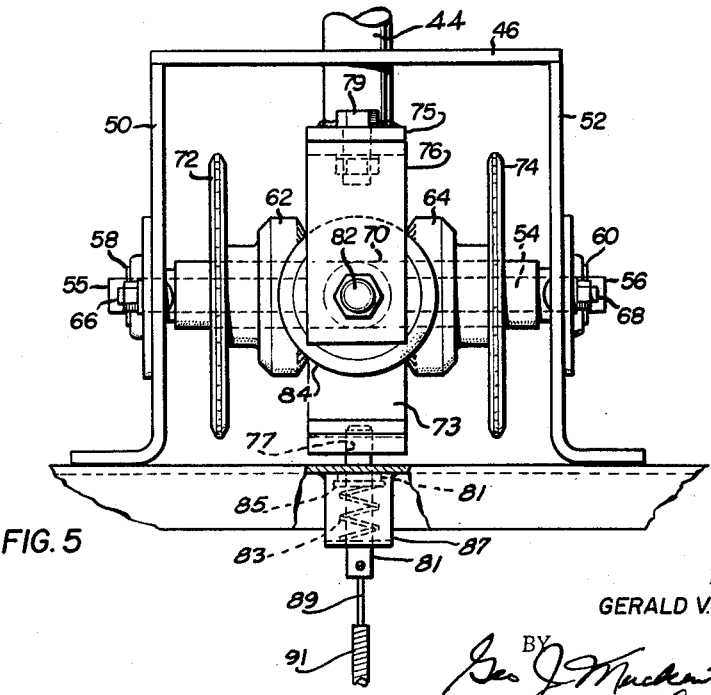
FIG. 5 is an enlarged rear view of the guidance control device.

As seen in FIG. 1, a handle 44 extends upwardly in front of seat 24 and this handle provides the means for controlling the driving and steering of the vehicle. Going to FIG. 2, handle 44 extends downwardly through the operator's platform to connect with a guidance control mechanism which includes a steering mounting assembly, also seen in FIGS. 5 and 6. This assembly comprises a hat-shaped structure 46 supported from a member 48 secured to the vehicle at points under the operator's station and the structure has upstanding side portions 50 and 52 connected by a front portion. A pivot shaft 54 having end portions 55 and 56 is journaled in side portions 50 and 52 by means of flange bearings 58 and 60 and the shaft carries bevel gears 62 and 64. Flange bearings 58 and 60 are secured to side portions 50 and 52 by bolts 66 and 68. Shaft 54 has an enlarged central portion 70 which spaces gears 62 and 64 from each other, and also includes a bore 71 through portion 70. As more clearly seen in FIGS. 5 and 6, a sprocket 72 is secured and adjacent to gear 62 and a sprocket 74 is secured and adjacent to gear 64.

The handle 44, as stated, extends through the operator's platform and is connected to a steering yoke 76 which yoke extends in a fore and aft direction and includes legs 78 and 80. A bar 75 is secured to yoke 76 by means of bolts 79. A shaft 82 extends through bore 71 of shaft portion 70 and carried by legs 78 and 80 so that shafts 54 and 82 intersect at the centers thereof and therefore move with one another.

Leg 80 extends downwardly and includes a portion 73 having a bore 77 through which is inserted a pin 81. A spring 83 surrounding the pin is captured by means of a washer 85 and a channel element 87 secured for holding the pin and the spring in the desired position. The captured spring and pin are a part of control means for a positive neutral lock which serves two purposes. The lock furnishes the operator a position for starting the machine in the neutral state and it also provides for a positive lock of lever 44 so that in case the lever is accidentally bumped the vehicle will not move. These are important safety features in this type of drive and steering mechanism as handle 44 provides the sole means for control of vehicle movement.

A cable 89 is secured to locking pin 81 and is encased in a suitable raceway 91 which extends to and is connected with a suitable handle or lever on a control console adacent the operator. The pin 81 is shown in the neutral and locked position in FIGS. 5 and 6. Whenever it is dedesired to move the vehicle, the operator pulls a handle or moves a lever such that cable 89 is pulled downwardly which, in turn, pulls pin 81 from bore 77 in portion 73. The handle or lever, of course, is made secure to keep the locking pin disengaged or released from element 73 during the time when the handle 44 is moved to drive and steer the vehicle. When handle 44 is returned to the neutral position and it is desired to lock the mechanism in neutral, the handle or lever on the control console is released and spring 83 forces pin 81 through bore 77 to lock the yoke 76. A switch may also be incorporated into the starting circuit so as to insure that the engine cannot be started unless the neutral locking pin is engaged.

Bevel gears 84 and 86 are carried on a bolt or shaft 82 and one gear 84 is secured by nut 88 to leg 78 of yoke 76. The other gear 86 is secured to the other leg 80 of yoke 76 by means of a head 90 welded to the leg and to shaft 82. Of course, washers and shims are used on both shaft 54 and shaft 82 to bring the parts together for the required fit. Gears 62 and 64 on shaft 54 mesh with gears 84 and 86 on shaft 82 and are fitted together so that there is no back-lash in the structure. Gears 62 and 64 are identical in design and structure and gear 84 is similar to gear 86 except for the retaining means in that gear 86 is secured to the leg 80 of yoke 76 and gear 84 is free to turn as an idler gear. It is thus seen that the gear structure is compact and is controlled by operation of the single handle 44.

Figure 2:
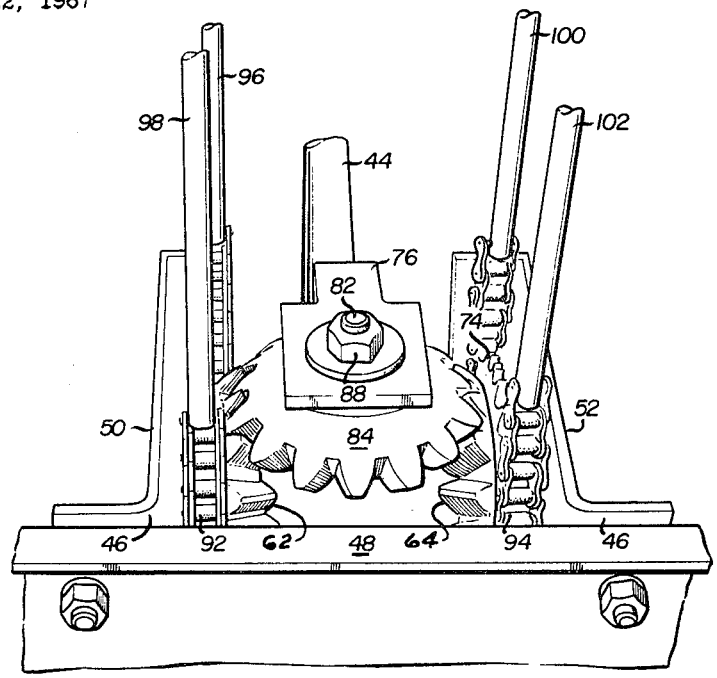
FIG. 2 is a perspective view of the guidance control gears and associated mechanism downwardly of the operator's station.

As seen in FIG. 2, sprockets 72 and 74 carry chains 92 and 94 which chains are connected to rods 96, 98, 100 and 102. These rods extend rearwardly and are connected to rods 97, 99, 101 and 103 respectively by means of turnbuckles, the latter rods extending to right angle mechanisms as seen in FIG. 3, wherein brackets 104 and 106 are secured to the frame of the vehicle.

Journaled in bearings on brackets 104 and 106 are shafts 108 and 110 which carry sprockets 112 and 114. These sprockets carry chains 116 and 118 which are connected to rods 97, 99, 101 and 103. Sprocket 112 carries chain 116 and the chain is connected to rods 97 and 99, and sprocket 114 carries chain 118 connected to rods 101 and 103. The shafts 108 and 110 extend to one side and shaft 110 is connected to control mechanism which varies the swash plate of front pump 28 which drives motor 32 for left-hand wheel 12. Referring back to FIG. 1, shaft 108 is journaled in a bearing at the left side of the frame and the shaft carries a sprocket 120 for a chain 122. Chain 122 is connected to rods 124 and 126 which extend rearwardly towards pump 26. Rod 124 is connected to a rod 125 by means of turnbuckle 127. A shaft 128 is journaled at the rear of the vehicle and is connected to control mechanism for varying the swash plate of pump 26. Shaft 128 carries a sprocket 130 and a chain 132, the chain being connected to rods 125 and 126.

Figure 3:
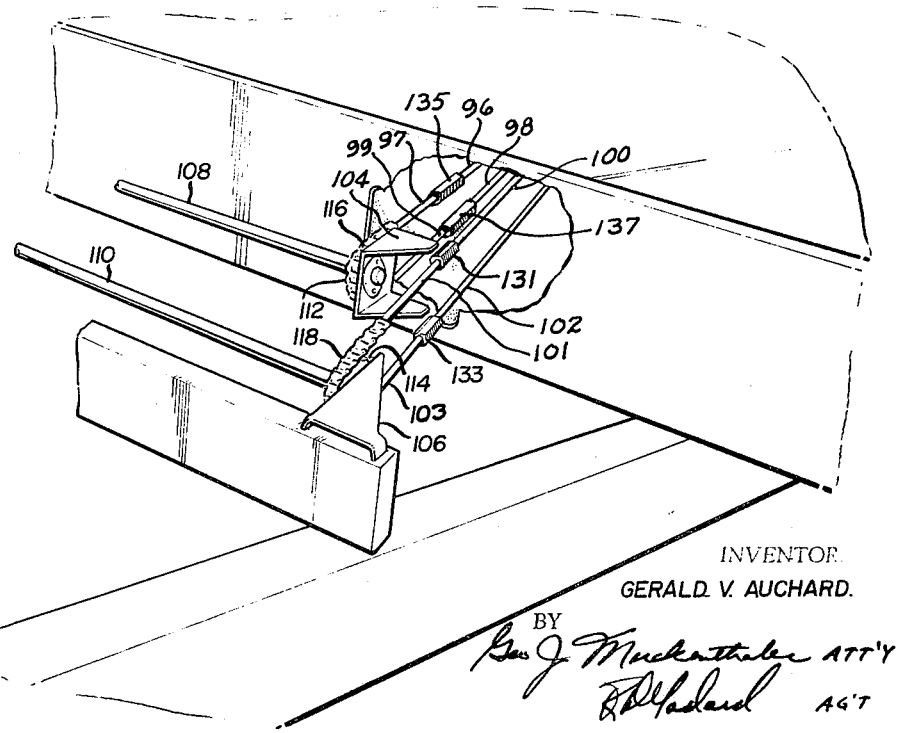
FIG. 3 is a perspective view showing control rods and sprockets between the control handle and the hydraulic pumps.

As seen in FIG. 3, turnbuckles 131 and 133 are used to adjust the rods in relation to the sprockets and to each other to maintain a taut control and to locate the neutral position. These are, of course, used initially to set and adjust the chains and sprockets to obtain the proper relationship of the bevel gears and they may need attention after some operation of the machine to keep the required tension in the control system. Turnbuckle 127 in FIG. 1 is likewise for the purpose of properly adjusting rods 124, 125 and 126.

It is thus seen that movement of handle 44 from a neutral position manually turns the bevel gears which turn the sprockets and rotate the shafts connected to pumps 26 and 28, whereby the pump swash plates are moved to vary the volume of fluid to the motors.

In the operation of this control system and referring to FIG. 4, handle 44 is shown in the neutral position. As the handle is moved forward towards F the four gears 62, 64, 84 and 86 rotate with shaft 54 by reason of handle 44 being secured to yoke 76 which in turn carries the shaft 82. The gears 62 and 64 and sprockets 72 and 74 are turned in the same direction and the same amount which causes rods 96 and 100 to move forwardly and rods 98 and 102 to move rearwardly, which, in turn, rotates sprockets 112 and 114 and shafts 108 and 100. Both pumps are varied the same amount by reason of the swash plates being moved from the neutral position and the same volume of fluid is pumped to the drive motors so that the vehicle is propelled in the forward direction. The forward speed is directly dependent upon the amount that handle 44 is moved forward of thhe neutral position.

Propelling the vehicle in a reverse or rearward direction is accomplished by movement of handle 44 rearward towards R from the neutral position which causes opposite motion from that just described. The gears and sprockets are turned in the direction such that the pumps and motors drive the vehicle in reverse.

Figure 10:
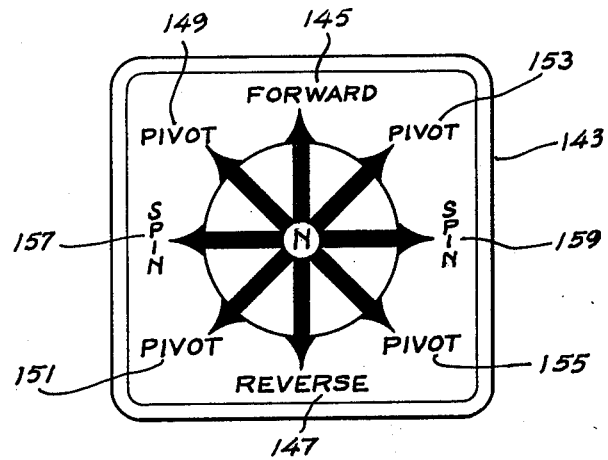
FIG. 10 is a diagram of a decal useful to the operator for steering the vehicle.

To better describe and understand the movements of handle 44 for driving and steering the vehicle, a diagram is shown in FIG. 10 which points out certain positions for accomplishing the desired direction and speed. This figure could be useful to the operator in steering the vehicle and may include a decal 143 upon which is imprinted information for directing the control handle movements. To propel the vehicle forwardly in a straight direction, handle 44 is moved directly to the forward position 145. Likewise, handle 44 is moved directly to the reverse position 147, to propel the vehicle rearwardly. When the handle is moved to the full forward position 145, the pumps are moving their full volume of fluid to the motors and the vehicle is being propelled at full speed. In similar fashion, when handle 44 is moved fully rearwardly, the vehicle is propelled at full speed in the reverse direction.

To make a left turn with the vehicle, handle 44 is moved to the left from the neutral position. Yoke 76, gears 84 and 86 and shaft 82 rotate in a counter-clockwise direction as viewed from the rear. One of the sprockets 72 is rotated clockwise and the other sprocket 74 is rotated counter-clockwise as seen from the right in FIG. 2. The connecting rods and shafts are moved such that the volume output of pump 28 is decreased or reduced and the volume output of pump 26 is increased. The left wheel motor receives less fluid and therefore slows down and the right wheel motor receives more fluid and is speeded up to turn the vehicle to the left. A left pivot turn forward is accomplished by moving the control handle at a 45° angle to the left and forward position 149 in FIG. 10, and in a left pivot turn rearward the handle is moved at a 45° angle to the left and rear position 151. In the left forward position of the handle, the left wheel remains in a neutral or fixed position and the right wheel is propelled at full speed so that the left wheel is turned in its tracks. In the left rear position, the right wheel is turned in its tracks and the left wheel is propelled at full speed.

A right turn is accomplished by moving handle 44 to the right from the neutral position. The action and movement of the components is opposite to that described for turning to the left. In similar manner, a right pivot turn forward and a right pivot turn rearward are accomplished by moving the handle 44 to the position 153 and 155 respectively.

The vehicle may be spun about its center by moving handle 44 directly to the left spin position 157 wherein both wheels are propelled, the left wheel being driven rearwardly and the right wheel forwardly. Moving the handle directly to the right position 159 spins the vehicle on its center, the wheels being propelled in directions opposite to those for a left spin.

A combination of turning and forward or rearward travel is done by moving handle 44 to positions in one of the four quadrants. Since the handle directly controls the direction and output of the variable pumps driving the motors by means of the linkages, the operator can select any direction and speed of travel desired. The speed of the vehicle in any direction is determined by the amount of movement of handle 44 from the neutral position.

Figure 7:
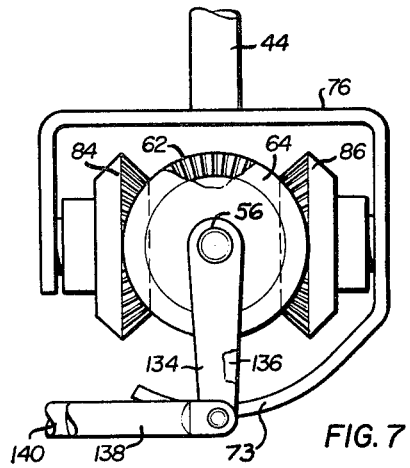
FIG. 7 is a diagrammatic side view of another embodiment of the means of control.
Figure 8:
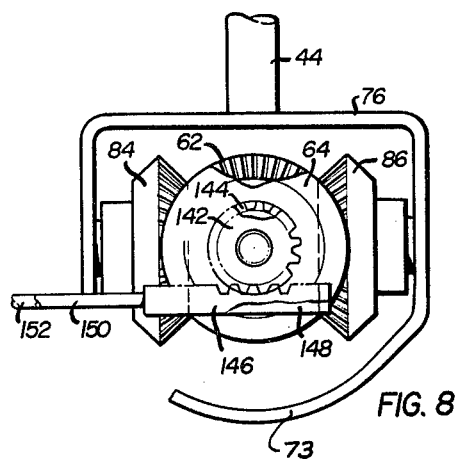
FIGS. 8 and 9 are similar views of further embodiments.
Figure 9:
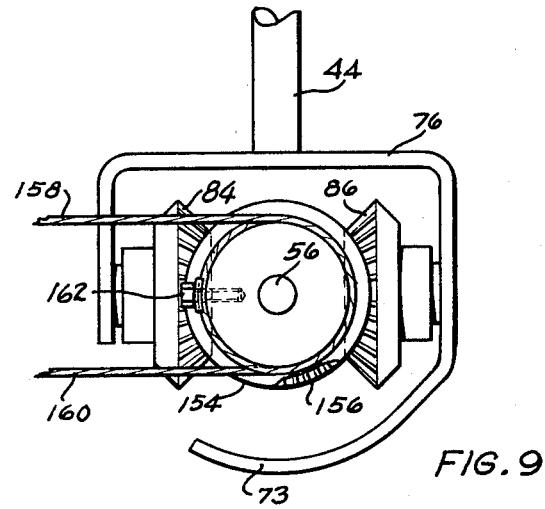

Other embodiments of the invention are shown in FIGS. 7, 8 and 9 wherein FIG. 7 shows the gears connected to a lever and rod arrangement, FIG. 8 shows the gears connected to a rack and pinion, and FIG. 9 shows the gears connected to a cable and drum.

FIG. 7 shows the yoke assembly 76, the handle 44 and the gears 62, 64, 84, and 86. The construction of this portion of the guidance control box is the same as described above for the chain and sprocket. Connected to end portions 55 and 56 of shaft 54 are downwardly extending levers 134 and 136 which are connected to pump control rods 138 and 140. As seen in FIG. 3 the chains and sprockets 116 and 118 and 112 and 114 would be replaced by levers similar to 134 and 136. The pump control arms and rods would then extend to the respective pumps for varying the swash plates. Similar levers and rods would be used at the points where the controls turn the corner, as seen in FIG. 1 for pump 26.

FIG. 8 shows the handle 44, the yoke 76 and the gears as in FIG. 7. Connected to end portions 55 and 56 of shaft 54 are pinions 142 and 144 meshing with toothed racks 146 and 148, the racks being connected to pump control rods 150 and 152. Similar racks and pinions may be used in place of the chains and sprockets where the control turns the corner.

FIG. 9 shows handle 44, yoke 76 and the gears as in FIGS. 7 and 8. Connected to end portions 55 and 56 of shaft 54 are drums 154 and 156 secured to turn with the shaft and with the gears. Cables 158 and 160 are secured to the drums, as at 162, such that the cable winds and unwinds on the drum.

It is thus seen that herein shown and described is a specific embodiment of the invention which provides for the advantages as set out above. The mechanism is simple and exact for controlling movement of vehicles of the type described. Variations other than the chain and sproket, the lever and rod, the rack and pinion, and the cable and drum devices may occur to those skilled in the art and it is to be understood that all such variations are contemplated as being within the scope of the invention. One skilled in the art may wish to combine two or more of the embodiments shown and described to form one control system.

What is claimed as new and desired to be secured by Letters Patent of the United States is:

1. A guidance control mechanism for a vehicle having a frame, an engine of the frame, RH and LH traction wheels in a ground engaging wheel, said mechanism including variable output hydraulic pumps connected to said engine and driven thereby, independent hydraulic motors drivingly connected respectively to each of said traction wheels, hydraulic lines connecting said pumps and motors, motion controlling means on said frame having intersecting shaft means and including an operating handle, means on said shaft means connected with said controlling means and with said pumps including pinion means on said shaft means position adjacent and connected with said controlling means, rack means intermeshed with said pinion means, linkage connected with said rack means, whereby movement of the operating handle varies the output of said pumps for driving and for steering said vehicle means for locking said handle in a neutral position at which the outlook of said pumps is zero, said locking means including a bore in said yoke, a pin movable into and out of the bore, means for biasing the pin, and means connected with the pin for moving the pin into a desired position.

2. A combined speed and steering control system for use in combination with a vehicle having a frame, RH and LH traction wheels, and a pair of reversible variable speed independently controlled hydraulic motor means respectively operatively connected to each of said traction wheels to selectively and independently drive said wheels in forward or reverse directions at selected speeds determined by the outlook of the motor means connected to the respective wheels; said combined speed and steering control mechanism comprising a first pair of opposed bevel gears mounted for rotation about a common first axis fixed relative to the vehicle frame, a second pair of opposed bevel gears each enmeshed with both of said first gears, a shaft having a longitudinal second axis perpendicular to an intersecting said first axis, one of said second gears being fixedly mounted on said shaft and the other of said second gears being mounted upon said shaft for free rotation about said second axis, control yoke means fixed to said shaft and manually operable to pivot said shaft in either direction from a neutral position about either or both of said first and second axes, said first gears being located in a neutral position about said first axis when said shaft is in its neutral position, a pair of independent control transmission means each independently coupling one of said first gears to one of said motor means to vary the direction of output of the coupled motor means in accordance with the direction in which that one of said first gears coupled thereto is displaced from its neutral position and to vary the speed of the coupled motor means in accordance with the magnitude of the rotative displacement of that one of said first gears coupled thereto from its neutral position, and locking pin means on said frame engageable with said yoke means for releasably locking said yoke means in its neutral position at which said control transmission means establishes a zero output for both of said motor means.

References Cited

UNITED STATES PATENTS

| | | | |
|---|---|---|---|
| 552,824 | 1/1896 | Cook | 74—586 |
| 970,974 | 9/1910 | Torbrand | 74—471 X |
| 1,641,567 | 9/1927 | Barling | 74—471 X |
| 3,091,130 | 5/1963 | Payerle et al. | 74—471 |
| 3,172,300 | 3/1965 | Schneider | 74—471 |
| 3,279,637 | 10/1966 | Olson et al. | 180—6.48 X |
| 3,323,607 | 6/1967 | Futamata | 180—6.48 |
| 2,906,356 | 9/1959 | Richard | 180—6.48 |

LEO FRIAGLIA, Primary Examiner

JOHN A. PEKAR, Assistant Examiner

U.S. Cl. X.R.

74—471